June 10, 1952 W. B. RUNDLE 2,600,333
MOLASSES MIXER
Filed June 19, 1950
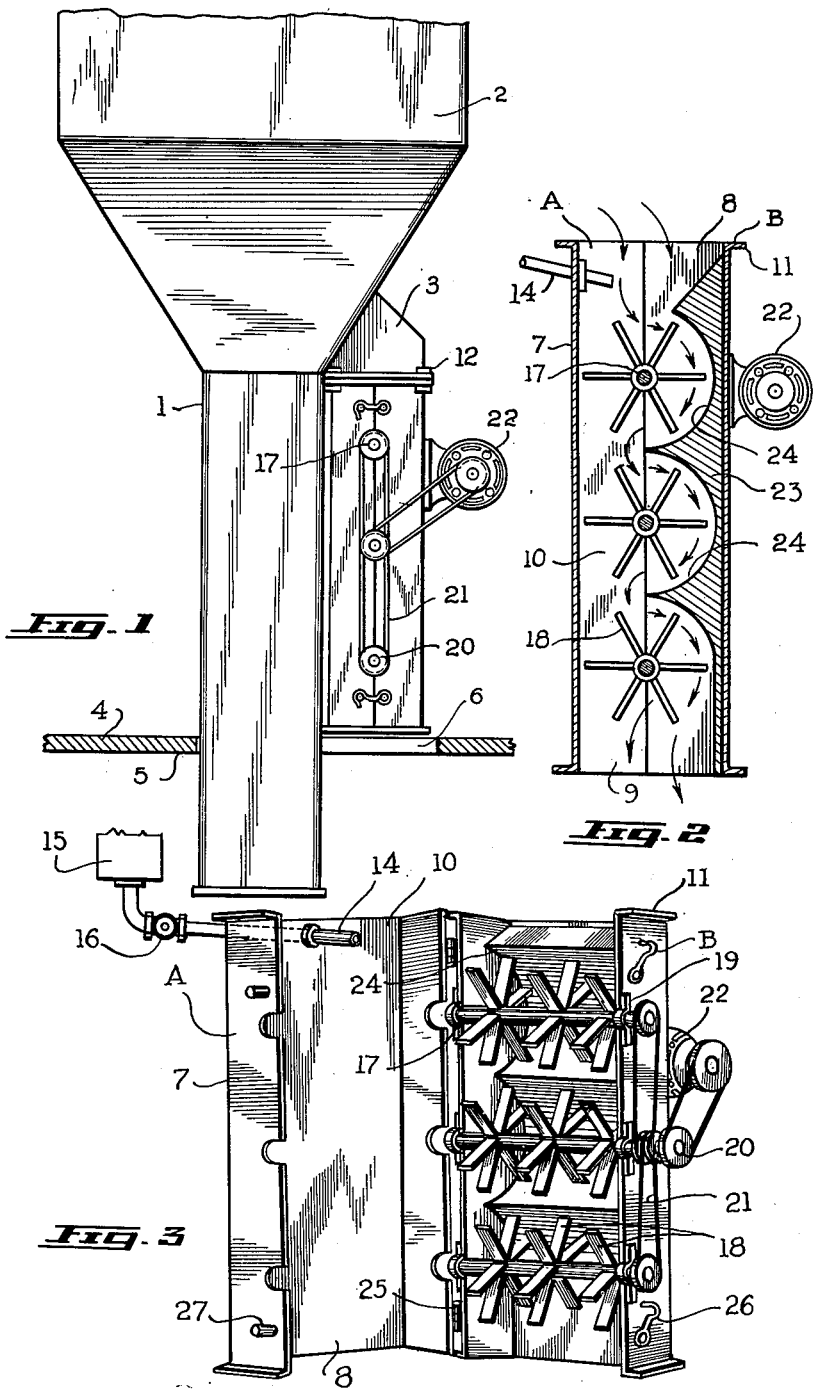
Inventor
WILLIAM B. RUNDLE
by W. Irwin Haskett
Attorney.

Patented June 10, 1952

2,600,333

UNITED STATES PATENT OFFICE 2,600,333

MOLASSES MIXER

William B. Rundle, Mount Forest,
Ontario, Canada

Application June 19, 1950, Serial No. 168,907

2 Claims. (Cl. 259—180)

This invention relates to improvements in a molasses mixer and appertains particularly to an attachment for a conventional type vertical feed mixer whereby molasses or other liquids may be blended with dry stock and poultry feeds.

An object of the invention is to provide a molassizer or the like formed as a complete unit and attachable to the valved bagging spout outlet of a feed mixer and capable of operation by its own separate motor.

A further object of the invention is to provide a molasses mixer for incorporation in a general feed mixing assembly wherein the molasses or other liquid is more thoroughly blended with the dry feed through a novel arrangement of rotating spider blades and deflecting baffles and wherein the molassized feed is returned to the feed mill pit and may be passed repeatedly through the molassizer as often as required to bring its molasses content up to the desired level or to produce a uniform and homogeneous product.

A still further object of the invention is the provision of a molasses mixing attachment of the nature and for the purpose set forth that is characterized by structural simplicity, efficiency and low cost of production, installation and operation whereby the same is rendered commercially desirable.

To the accomplishment of these and related objects as shall become apparent as the description proceeds, the invention resides in the construction, combination and arrangement of parts as shall be hereinafter more fully described, illustrated in the accompanying drawings, and pointed out in the claims hereunto appended.

The invention will be best understood and can be more clearly described when reference is had to the drawings forming a part of this disclosure wherein like characters indicate like parts throughout the several views.

In the drawings:

Figure 1 is a side elevation of the molasses mixer applied to the bagging spout of a conventional type vertical feed mixer;

Figure 2 is an enlarged vertical transverse section through the molasses mixer; and Figure 3 is a perspective view thereof in opened position.

A vertical type feed mixer of conventional design is shown in Figure 1. Such a mixer normally has a stack or cylinder 1, enclosing an auger conveyor, and is surmounted by a large hopper-like chamber 2 from which an outlet or bagging spout 3 issues near the base. The auger stack 1 rises through the mill floor 4 from an underlying pit 5 whose loading mouth 6 is here shown directly under the spout 3.

My molasses mixer, removably attached to the outlet or bagging spout 3, receiving the output therefrom and discharging through the loading mouth 6 back into the pit 5, comprises a vertically elongated housing 7 substantially rectangular in horizontal cross-section with the top 8 and bottom 9 both open and a substantially vertical passageway 10 provided therethrough. The rim 11 of the open top is flanged and connects to the bagging spout 3 by removable bolts 12.

A liquid supply line 14 from a suitable source 15 and controlled by a convenient valve 16 feeds or delivers into the molasses mixer housing near the upper end.

The housing 7 is traversed by vertically spaced, parallel horizontal shafts 17 each provided with radiating, spider-like blades 18 for the length thereof and these shafts are journalled at opposite ends in bearings 19 mounted on the housing. Exterior of the housing the shafts carry pulley wheels 20 for the belts 21 and are all rotated in the same direction by a motor 22 that may also be mounted on the exterior of the mixer housing. On the interior of that side of the housing toward which these radial bladed, spider-like mixing elements throw, I provide a deflecting structure 23 having an arcuate baffle 24 opposite each revolving spider-like bladed beater and substantially concentric therewith, whereby the flow of dry stock food and liquid such as molasses, buttermilk, feeding oils and the like passing through this attachment will be thoroughly blended or homogenized without danger of clogging or becoming impeded.

In the present embodiment, the housing is shown as composed of two laterally separable, complementary parts A and B hinged together as at 25 along one vertical edge and normally held closed at the other edge by releasable fastenings such as the hooks and pins 26 and 27. It will be noted that all the mechanical driving and driven parts of this mixing attachment are mounted on the part B, making for simpler and more efficient construction, assembly and operation.

In use, feed is carried up from the pit to the hopper and flows out the spout thereof in the usual way, whence it passes into this molasses mixer attachment, operated by its own motor and has liquid flowing in through the line 14 thoroughly blended therewith, being discharged from the open bottom through the loading mouth back into the pit. Thus the feed is passed successively, as often as required, through the molasses mixer attachment by which I am enabled by this efficient mixing mechanism of vertically spaced beaters, all turning in the one direction and at approximately 2800 R. P. M., to readily incorporate the desired amount of liquid, as for instance a molasses content of up to 15% or more.

From the foregoing description taken in connection with the accompanying drawings, it will be manifest that a molasses mixer is provided that will fulfill all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

Having thus described the invention, what I claim as new is:

1. A molasses mixer for a vertical type dry feed mixer comprising a hollow, square in cross section and vertically elongated housing open at top and bottom with a direct vertical passageway therethrough and attachable to the outlet spout of the dry feed mixer by the open top thereof; a plurality of rotatable shafts vertically spaced in said housing and horizontally traversing the passageway therethrough; spider-like blades radiating from each shaft at spaced intervals along the length thereof; driving means for said shafts turning them all in one direction; vertically spaced arcuate baffle-like structures on the inside of said housing one opposite each of said bladed shafts and on one side of said housing only, namely that side toward which the upper part of the bladed shafts throw; and a liquid supply line feeding into said housing above the uppermost of said rotatable shafts.

2. A molasses mixer for a vertical type dry feed mixer comprising a hollow, square in cross-section and vertically elongated housing open at top and bottom with a direct vertical passageway therethrough and attachable to the outlet spout of the dry feed mixer by the open top thereof; a plurality of rotatable shafts vertically spaced in said housing and horizontally traversing the passageway therethrough; spider-like blades radiating from each shaft at spaced intervals along the length thereof; driving means for said shafts turning them all in one direction; vertically spaced baffles, one opposite each of said bladed shafts, and a liquid supply line feeding into said housing above the uppermost of said rotatable shafts; said housing being formed of two complementary, laterally separable parts hinged together along one vertical edge and releasably secured together at the opposite edge and said bladed shafts and the driving means therefor being all mounted on one of said housing parts; one part of said housing remaining attached to the mixer spout, while the shaft and driving means-carrying housing part is releasable to swing open on and while supported by said attached part.

WILLIAM B. RUNDLE.

REFERENCES CITED

The following references are of record in the file of this patent:

UNITED STATES PATENTS

| Number | Name | Date |
|---|---|---|
| 803,945 | Weinrich | Nov. 7, 1905 |
| 1,413,345 | Morris | Apr. 18, 1922 |
| 2,504,486 | Anderson | Apr. 18, 1950 |

FOREIGN PATENTS

| Number | Country | Date |
|---|---|---|
| 474,707 | Great Britain | Nov. 5, 1937 |